Dec. 4, 1923.

C. J. TOTH 1,476,306

INTERNAL COMBUSTION ENGINE

Filed March 16, 1922  5 Sheets-Sheet 1

Fig.1,

Inventor
Charles J. Toth.
By his Attorneys
Ward, Crosby and Smith

Dec. 4, 1923.

C. J. TÓTH 1,476,306

INTERNAL COMBUSTION ENGINE

Filed March 16. 1922

Inventor
Charles J. Toth.
By his Attorneys
Ward, Crosby and Smith

Dec. 4, 1923.

C. J. TÓTH 1,476,306

INTERNAL COMBUSTION ENGINE

Filed March 16, 1922     5 Sheets-Sheet 4

Fig. 7,

Inventor
Charles J. Tóth
By his Attorneys,
Ward, Crosby and Smith

Fig. 8

Patented Dec. 4, 1923.

1,476,306

UNITED STATES PATENT OFFICE.

CHARLES J. TÓTH, OF NEW YORK, N. Y., ASSIGNOR TO INTERNATIONAL PROCESS AND ENGINEERING CORPORATION, OF NEW YORK, N. Y., A CORPORATION OF NEW YORK.

INTERNAL-COMBUSTION ENGINE.

Application filed March 16, 1922. Serial No. 544,360.

*To all whom it may concern:*

Be it known that I, CHARLES J. TÓTH, a citizen of the Republic of Uruguay, and resident of 322 West 57th Street, New York city, county, and State of New York, have invented certain new and useful Improvements in Internal-Combustion Engines, of which the following is a specification.

The invention relates to internal combustion engines and particularly to such engines of the two cycle type. One of the objects of the invention is the provision of an improved engine of this type having its parts so constructed and related as to provide for "supercharging" the cylinder. In the present construction the exhaust ports of the cylinder are closed, cyclically, before the inlet ports are closed. The air, or mixture thus continues to pass through the inlet ports into the cylinder during the interval between the closing of the exhaust ports and the closing of the inlet ports, and this continued charging of the cylinder after the exhaust ports have closed is what is referred to herein as the "supercharging" of the cylinder. In the usual forms of two cycle engines such action is not possible, because of the fact that in them the exhaust ports remain open until after the inlet ports have closed, so that no air or mixture can be forced into the cylinder after the exhaust openings thereof have been closed, except by arrangements employing a valve as in a Diesel type of engine, which valve is eliminated in the present invention.

In my application Serial No. 544,359, filed on March 16, 1922, a construction is described for accomplishing this "supercharging" in which a pair of cylinder elements communicating with a common combustion chamber, are provided, one piston operating in each of these cylinder elements, the pistons being connected to the crank shaft in such a way as to give one piston a lead over the other during its stroke so that the exhaust ports, controlled by this piston, will be opened before the inlet ports are opened by the other piston, and are closed before the inlet ports are closed by the other piston. By such an arrangement extremely effective scavenging may be had, as well as the overcharging referred to above.

In the present invention similar effects are obtained by a construction in which a pair of pistons operate within the same cylinder, one of the pistons being slidably mounted within the other. Various ports are provided in the cylinder casting and within the wall of one of the pistons, the two pistons being so operated as to cover and uncover the various ports in such manner as to obtain the desired effect.

Preferably the inner piston, which may be of an ordinary type, is given a longer stroke than the outer piston which is preferably of the differential type, and the inner piston is also preferably retarded a certain amount in its stroke circle in relation to the outer piston. Preferably also the outer piston is utilized to cause the precompression of air or combustible mixture before the latter is admitted into the combustion chamber of the engine.

The invention consists in the novel features, arrangements, constructions, and combinations of parts, hereafter described in their preferred embodiments. These result in the production of an effective and comparatively simple apparatus of the character indicated, in which a very positive scavenging of the cylinder and an effective supercharge in the combustion chamber are accomplished.

In order that the invention may be more clearly understood attention is hereby directed to the accompanying drawings forming part of this application and illustrating certain embodiments of the invention. In the drawings—

The engines illustrated in the various figures are all of the two cycle type, and are adapted either to be used in connection with carbureting means, to operate on the usual combustible mixture, or to draw in outside air which is compressed in the combustion chamber to produce a high degree of heat, in the manner of the Diesel form of engine. In the first case the cylinder may be provided with spark plugs while in the second case the cylinder may be provided with the usual fuel injectors.

Referring first to Figures 1 to 4 of the drawings, an engine is illustrated comprising a single cylinder within which operate two pistons. It will, of course, be understood that the engine may comprise a plurality of such cylinders arranged in any usual manner.

As shown in the drawings, the cylinder casting 1 may be provided with a water jacket as shown at 2 and with air or mixture receiving chambers to be described hereafter. The cylinder casting 1 contains a combustion chamber 3 and may be provided with the usual fittings including spark plugs or fuel injectors in accordance with the type of engine. An opening is indicated in the casting at 4 for the reception of a spark plug or fuel injector.

Figure 1:
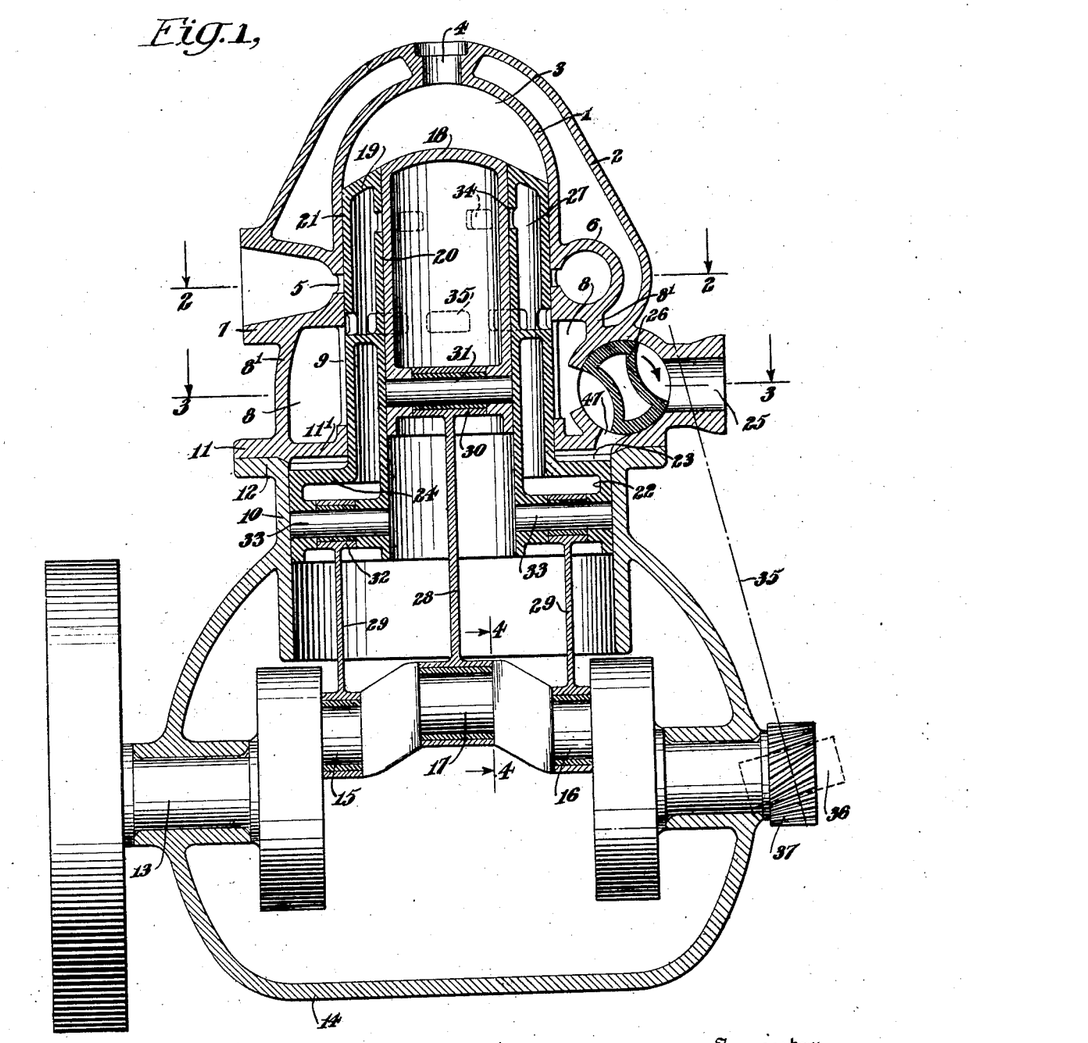
Fig. 1 represents a vertical section taken through one form of apparatus embodying the invention.
Figure 2:
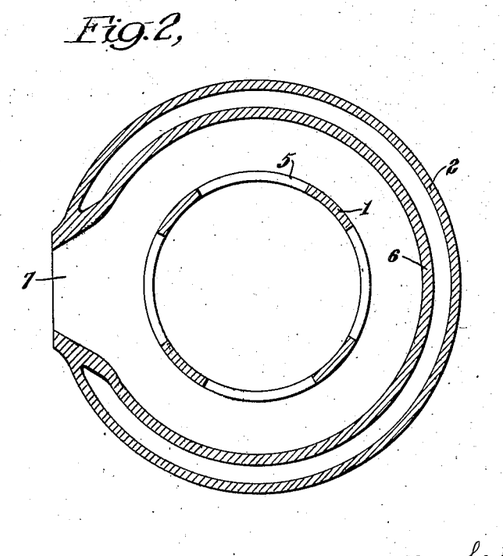
Figs. 2 and 3 represent horizontal sections taken respectively on line 2—2 and 3—3 of Fig. 1, the piston being omitted in each case.

The exhaust port openings 5, see Figs. 1 and 2, may be equally spaced around the circumference of the cylinder, the cylinder casting being provided with an annular manifold 6 extending around the same to form a channel communicating with all of the ports 5. This annular channel leads to the atmosphere or to an exhaust muffler, or the like, through the opening 7.

Figure 3:
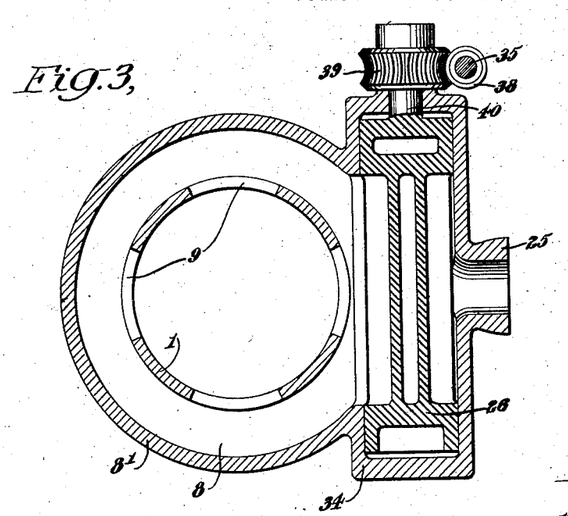

What may be termed a receiving chamber 8 is provided about the cylinder casting at a position somewhat below the exhaust ports, this receiving chamber being formed between the wall 1 of the cylinder proper and the outer wall portion 8¹ which extends downwardly from the exhaust passage 6, as is indicated in Figs. 1 and 3. Ports 9 are provided in the inner wall of receiving space 8 to establish communication between this receiving space and the interior of the cylinder proper at suitable times. These ports may be spaced around the entire diameter of the cylinder, as is shown in the construction illustrated in Fig. 3. The base 10 of the cylinder may be cast in one piece with the cylinder proper or may, as illustrated, be a separate member on which the cylinder 1 is mounted. As shown in the drawings the cylinder 1 is provided with a bottom flange 11 which is secured on the top flange 12 of base member 10, a portion, 11¹, of flange 11 serving to form the bottom portion of the receiving chamber 8 referred to.

Figure 4:
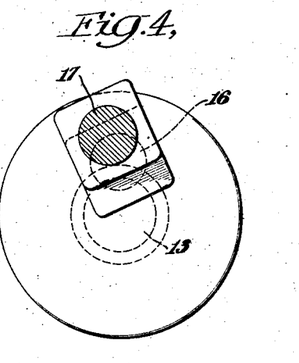
Fig. 4 is a vertical section taken on line 4—4 of Fig. 1.

As illustrated a crank shaft 13 may have suitable bearings in the crank case 14, the upper portion of the latter being shown as comprising or being integral with the base member 10 of the cylinder. The crank shaft is provided below the cylinder with a specially designed throw having two pins 15 and 16 of equal stroke and a pin 17 between the same of greater stroke, the pin 17 being set back a number of degrees in relation to the stroke circle of pins 15 and 16, as is shown in Fig. 4, the purpose of this arrangement being explained hereinafter.

Two pistons are provided within cylinder 1, an inner piston 18 which may be of ordinary construction and an outer piston 19 within which piston 18 is slidably mounted. In the form of invention shown in Fig. 1 the outer or stepped piston 19 is of the differential type, having an upper hollow cylindrical portion comprising inner and outer walls 20 and 21 and a bottom portion of greater diameter having the inner wall 20 and outer wall 22. The outer wall 21 of the portion of smaller diameter of the differential piston is slidably mounted within the cylinder 1, while the lower portion of larger diameter, 22, is slidably mounted within the base portion 10 of the cylinder. The inner piston 18 is as shown slidably mounted within the inner wall 20 of the outer, differential, piston. A precompression space 23 is provided, in the form of invention shown in Fig. 1, between the upper annular portion 24 of the lower, larger portion of the outer piston and the flange 11¹ of the cylinder casting above the same.

Air or mixture to be drawn into the cylinder enters through a passage 25 which may open into the atmosphere, in the case of a Diesel type of engine, or may extend to a suitable carbureter, in the usual form of engine in which combustible mixture is drawn into the cylinder. In the form of construction shown in Fig. 1 a valve 26, hereafter to be described, is used to control the entrance of air through intake passage 25.

At suitable times in the operation of the engine air will be admitted past valve 26 into the precompression space 23. On the upward movement of the differential piston 19, in the form of construction shown in Fig. 1, this air or mixture will be compressed in the precompression chamber 23 and in the receiving space 8, which at certain times communicates with space 23. The air or mixture in receiving space 8 passes at suitable times into the interior space 27 between the inner and outer walls 20 and 21 of the outer piston, from which space the air or mixture passes into the combustion chamber 3 at the proper times. The arrangement of ports by which these movements are accomplished will be described hereafter.

The inner piston 18 is connected by a connecting rod 28 with the pin 17 of the crank shaft while the outer piston 19 is connected by connecting rods 29, 29, with the crank pins 15 and 16. The three connecting rods are pivotally connected to their cranks in the usual manner, while connecting rod 28 is provided at its upper end with a sleeve 30 which is suitably mounted for oscillation about a transverse pin 31 carried by piston 18, connecting rods 29 having upper sleeve portions 32 mounted for oscillation about pins 33, which extend transversely through the lower portions 22 of the outer piston 19. As stated, the inner piston has a longer stroke than the outer piston, and is also retarded somewhat in its angular position with respect to the outer piston so that the inner and outer pistons will be together, or substantially so, at their upper and lower dead center positions, but will be at different relative positions at all other points in the stroke circle. The relative positions of the pistons will be more fully described hereafter with particular reference to the diagram illustrated in Fig. 8.

In the inner wall 20 of the outer piston a number of port openings 34 are formed by which air or mixture contained within the interior space 27 of the outer piston will pass into combustion chamber 3 of the cylinder when these ports are uncovered by the upper edge of the inner piston 18. A number of port openings 35 are provided through the outer wall 21 of the outer piston, which in various positions of the piston 19 will establish communication between the interior space 27 of piston 19 and the receiver space 8, such communication being established when port openings 35 in the outer wall of the outer piston register with the openings 9 in the wall of the cylinder casting 1.

In certain forms of construction it is advisable to provide what I may term a distribution organ, such as the rotary valve 26, it being understood, however, that other types of valve may be used. It also may be noted that with the form of construction shown in Fig. 1 such a distribution organ may be eliminated when a plurality of cylinders are used with the cylinders either arranged in a straight line or radially. In the case of a single cylinder motor, such as is illustrated, however, such a distribution organ is desirable because of the fact that the pulsation of the mixture or air in the precompression space 23 does not correspond with the intake stroke of the engine. When a valve, such as the rotary valve 26 shown, is used, it may be made to serve two functions, first to control the intake of air or mixture into the precompression space 23, and second to shut off communication between space 23 and the receiver space 8 at a later time, when a volume of compressed air or mixture has passed from space 23 to space 8, as will be more fully explained hereafter.

The rotary valve 26 may be of substantially the form shown in the drawings, such form not, however, being essential. The valve is shown as mounted for rotation within a cylindrical housing 34 Fig. 3. The valve may be driven by suitable means, such as the shaft indicated at 35, carrying a gear indicated at 36, which meshes with a gear 37 on crank shaft 13 while the other end of shaft 35 carries a suitable gear 38, which meshes with gear 39 on the stud shaft 40 extending from one end of the valve. Gears 36 and 37 may be of helicoidal type, while gears 38 and 39 may suitably be a worm and worm wheel. The gearing is preferably so designed as to rotate valve 26 at one-half the rate at which the crank shaft rotates.

Figure 8:
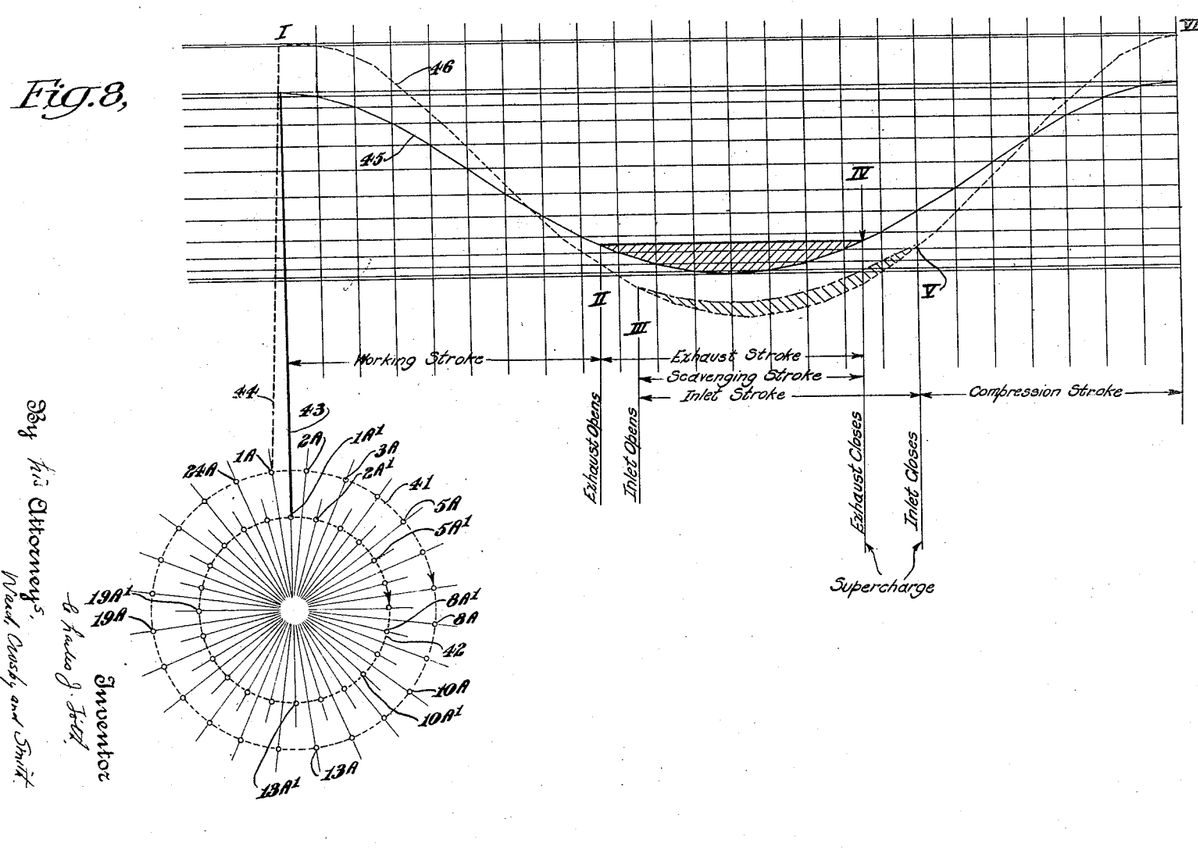
Fig. 8 is a diagrammatic view illustrating graphically the operation of the engine.

The operation of the engine may be best understood in connection with the diagram shown in Fig. 8. In the diagram the dotted circle indicated at 41 represents the stroke circle of the inner piston 18 while the stroke circle of the outer piston 19 is indicated by the dotted circle 42. The position of the connecting rods 29 at the upper dead center of the engine is indicated by the full line 43 while the position of the connecting rod 28 at the upper dead center is indicated by the dotted line 44, in which the angular retardation of this connecting rod at this point is indicated. The stroke circle 41 of the inner piston is shown as divided into twenty-five positions, $1^A$ to $24^A$ beginning with the upper dead center position, and the stroke circle 42 of the outer piston is similarly divided into twenty-five positions, $1^{A1}$ to $24^{A1}$ respectively.

The relative positions of the two pistons at different points in their strokes are indicated by the full line 45 representing the positions of the outer piston and the dotted line 46, representing the positions of the inner piston. The various important piston positions, developed on a horizontal surface in a well known manner, are indicated by the reference characters I, II, III, IV, V, and VI, which correspond to various positions shown on the stroke circle diagram.

It will be noted that, as has been said, the exhaust port openings 5 are opened by the piston 19, on its down stroke, before the inlet ports 34 are opened by the inner piston 18 descending with a lead to uncover the same, the exhaust ports opening at position II and the inlet ports opening at position. III. On the up stroke of the pistons the exhaust ports are closed before the inlet ports, the exhaust ports closing at position IV while the inlet ports close at the position V.

Air or mixture enters through intake passage 25, and passes by the lower edge of valve 26 and into the precompression space 23, on each down stroke of the pistons, the valve reaching a position in which air may enter past the same at about the position $5^A$ on the stroke circle diagram. The outer piston moving downwardly, the air mixture will be sucked into space 23 until the valve 26 has moved sufficiently to close opening 25, which will take place about position 10$^A$. When piston 19 begins its up stroke, shortly thereafter, the air or mixture will be compressed in space 23, and in receiver space 8, the shape and position of valve 26 leaving the passage 47 between chambers 23 and 8 open at this time. This precompression of the air or mixture in chambers 23 and 8 will continue during all of the up stroke of the pistons and for a short interval beyond the upper dead center position, or until piston 19 has reached approximately position 2$^A$, when valve 26 will close passage 47 between chambers 23 and 8. The compressed air or mixture in space 8 will remain therein until ports 35 in piston 19 come into alignment with openings 9 in the cylinder casting, permitting this compressed air or mixture to enter space 27 in piston 19. Thereafter, when ports 34 are opened by piston 18 descending below these ports, the air or mixture in space 27 will pass into the combustion chamber 3, this taking place at the position marked III in Fig. 8, as previously stated.

In the position of the ports shown in Fig. 1, one piston is at its upper dead center, and the other is slightly behind this position, and the explosion or combustion of the charge in combustion chamber 3 takes place at about this point, and the working stroke of the engine begins. As stated, at the position marked II the upper surface of the piston 19 reaches the upper edge of the exhaust port openings 5, and the exhaust stroke is started. Both pistons continuing their downward movement, the piston 18, because of its greater stroke, will obtain such a lineal lead over piston 19 that at the position marked III piston 18 will begin to open the inlet ports 34 and start the scavenging stroke. During the following up stroke the piston 19 will reach the position marked IV when it will again close the exhaust port openings 5. During the continued upward movement, the upper edge of piston 18 will move past the inlet openings 34 in the inner wall of piston 19 to close these openings at position V, this position being governed by the fact that piston 18 is retarded in its stroke circle, in relation to the stroke circle of piston 19.

During the period from the position IV when the exhaust ports close to the position V when the inlet ports close a positive supercharging of the interior of the cylinder with combustible mixture or fresh air will take place. During the remaining up stroke from position V to the final position indicated at VI the compression of the air or mixture in combustion chamber 3 will take place, the ignition of the compressed charge in chamber 3 taking place at or near the position marked VI.

Figure 5:
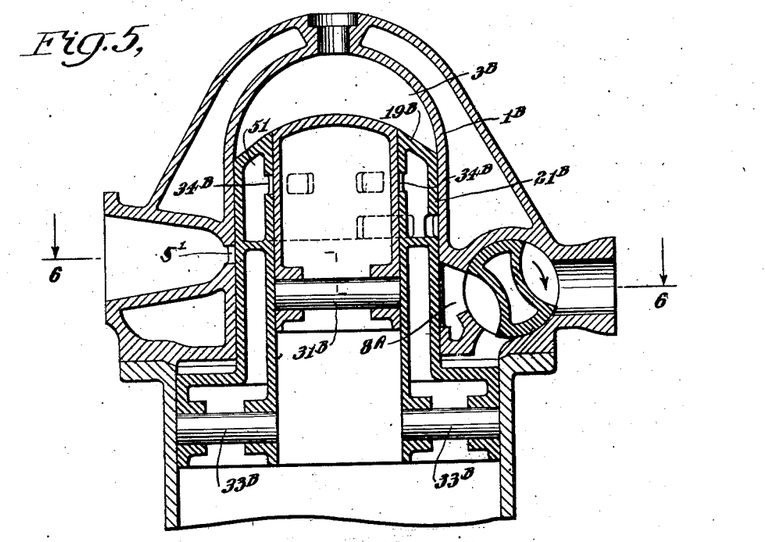
Fig. 5 represents a vertical section taken through the cylinder and piston of a modified form of construction.
Figure 6:
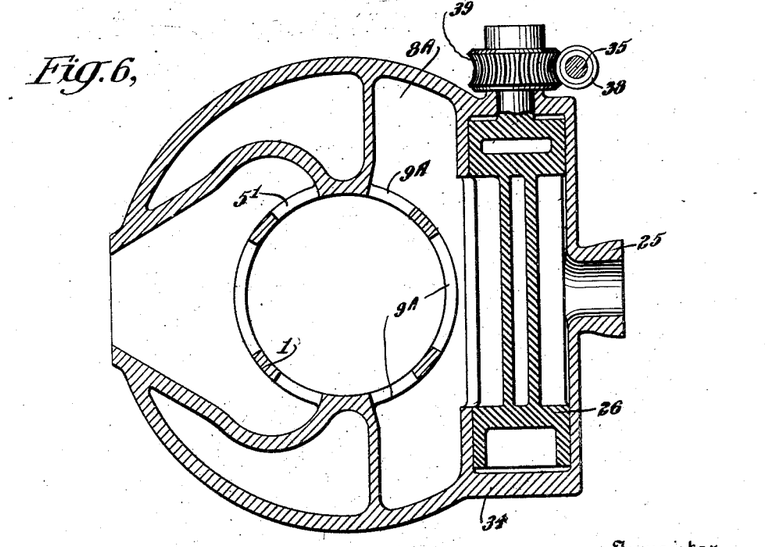
Fig. 6 is a horizontal section taken on line 6—6 of Fig. 5, the piston being omitted.

A somewhat modified form of construction is shown in Figs. 5 and 6. As is indicated in these figures, the exhaust port openings 5$^1$ may be arranged around only a portion of the circumference of cylinder 1 instead of around the entire circumference, as is the case with the exhaust openings 5 shown in Fig. 2. In the construction shown in Figs. 5 and 6 the receiver space 8$^A$ is arranged somewhat differently from the receiver space 8 in the form of construction previously described, and the ports 9$^A$ in the cylinder casting, which lead into receiver space 8$^A$, are shown as extending around only a portion of the circumference of the cylinder. In other respects the construction shown in Figs. 5 and 6 is similar to that previously described.

Figure 7:
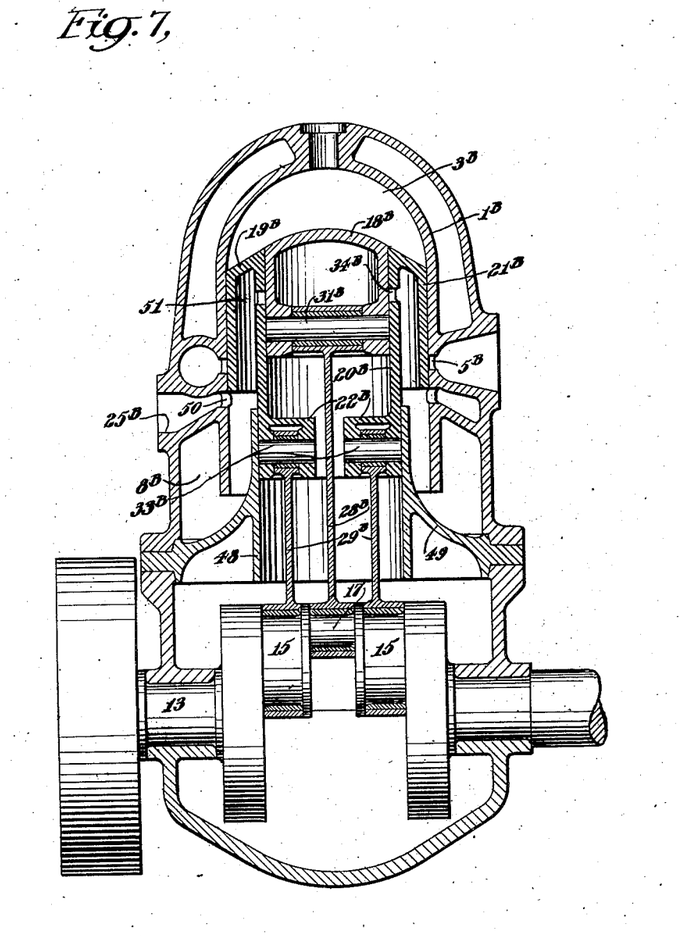
Fig. 7 is a vertical section similar to that shown in Fig. 1, but illustrating a further modification of the invention.

The construction shown in Fig. 7 operates in accordance with the same general principles as the constructions previously described, except that the valve 26 is done away with, the entrance of air or mixture into the precompression chamber being controlled by the outer portion of the outer or differential piston. Also in the construction shown in Fig. 7 the precompression of the air or mixture takes place on the down stroke of the pistons instead of during the up stroke as in the form of the construction previously described.

In the construction shown in Fig. 7 the inner piston 18$^B$ is provided with a cylindrical portion extending downwardly a comparatively short distance and provided with a transverse pin 31$^B$ to which is pivotally connected the connecting rod 28$^B$ which is pivotally mounted on the crank 17 of crank shaft 13. An outer, or differential, piston 19$^B$ has on its stem a pair of bosses 22$^B$ extending inwardly, toward the vertical center line of the cylinder, these bosses being formed on the inner wall 20$^B$ of the hollow outer piston. Bosses 22$^B$ are provided with pins 33$^B$, connecting rods 29$^B$ being pivotally connected at their upper ends to pins 33$^B$, and at their lower ends to the cranks 15 of the connecting rod.

The outer cylindrical portion 21$^B$ of the outer piston 19$^B$ slides in contact with the wall of the cylinder casting 1$^B$ while the inner wall 20$^B$ of the outer piston, within which piston 18$^B$ is slidably mounted, itself slides within a cylindrical portion 48 of a base member 49, a downwardly and outwardly sloping flange of which forms the bottom of the precompression space 8$^B$ in the lower portion of the cylinder 1$^B$.

Air or mixture is drawn in, during the up stroke of piston 19$^B$ through the opening 25$^B$, this opening communicating with the interior of the cylinder through ports indicated at 50 which may be spaced around the circumference of the cylinder. These ports are open when the lower edge of the apron or outer portion 21ᴮ of the outer piston rises above the same, as is shown in Fig. 7. Ports 50 may begin to open, for example, when the outer piston has completed approximately five-sixths of its up stroke, so that these ports will again be entirely closed when the outer piston has completed about one-sixth of its succeeding down stroke. Air or mixture will be drawn into space 8ᴮ and the space 51 between the inner and outer portions 20ᴮ and 21ᴮ of the outer piston during the portion of the up stroke in which these ports are open and also, because of the rapidity of movement of the parts, during the portion of the down stroke, during which these ports are open. During the down stroke of the outer piston the air or mixture will be compressed in spaces 51 and 8ᴮ until the inlet ports 34ᴮ leading to the combustion chamber 3ᴮ are opened. These inlet ports 34ᴮ are spaced around the inner wall 20ᴮ of the outer piston and will be opened when the upper edge of the inner piston 18ᴮ descends past the same on the down stroke of the pistons. This will occur at about the position III, shown in Fig. 8, at which time the inlet ports 34 in the form of construction first described are opened.

The exhaust ports 5ᴮ in the cylinder casting, spaced around the circumference of the same, are controlled by the lower edge of the outer portion 21ᴮ of the outer piston in the same manner that the exhaust ports 5 of the form of construction first described are controlled by the lower edge of the outer portion 21 in that construction. With this arrangement the exhaust ports 5ᴮ will begin to open at about the position II in diagram 8, on the down stroke of the pistons, in the same manner as has already been described in connection with the first form of construction.

Accordingly the working cycle will be the same in the form referred to as in the form first described, except for the difference noted that the charge of air or mixture will be drawn in on the up stroke and compressed on the down stroke and that no organ of distribution is required to control the entrance of the air or mixture and to control the transfer of the same from one space to another prior to its admission to the combustion chamber. That is to say, in both forms of construction the working stroke of the piston, referring to Fig. 8, will extend from position I to position II at which point the exhaust opens, while the inlet ports open at III, and an efficient scavenging stroke taking place from position III to position IV when the exhaust ports close. Supercharging takes place from position IV to position V when the inlet ports close, the compression stroke then taking place from position V to position VI. The exhaust stroke, of course, occurs from position II to position IV.

It should be understood that the invention is not limited strictly to the details of construction which have been particularly described, but is as broad as is indicated by the accompanying claims. It may be noted, however, that claims which may be generic both to the constructions herein described and the constructions described in my said copending application, Serial No. 544,359, will be made in the latter application.

What I claim is:—

1. In an internal combustion engine, the combination of a cylinder, having a combustion chamber with intake and exhaust openings, a piston having inner and outer walls, slidably mounted therein, said inner wall having an opening therethrough, an inner piston slidably mounted within said first piston, and means for causing said pistons to reciprocate in such manner that said outer piston will entirely control said intake and exhaust openings, and said inner piston will cover and uncover said inner wall opening of said outer piston at suitable times.

2. In an internal combustion engine, the combination of a cylinder, having a combustion chamber and intake and exhaust openings, a piston having inner and outer walls, slidably mounted therein, said inner wall having an opening therethrough, an inner piston slidably mounted within said first piston, and means for causing said pistons to reciprocate in such manner that said outer piston will entirely control said intake opening and said inner piston will cover and uncover said inner wall opening of said outer piston at suitable times to control admission of charge therethrough to the combustion chamber, said pistons acting jointly to compress the charge in the combustion chamber and to be driven by the expanding charge after combustion thereof.

3. In an internal combustion engine, the combination of a cylinder having an intake and an exhaust opening, two pistons therein, one slidable within the other, the outer piston having an interior space with openings through its inner and outer walls, and means for so operating said pistons as to cause said outer wall opening of said outer piston to register with said cylinder intake at one time, and said inner piston to cover and uncover said inner wall opening of said outer piston at suitable times.

4. In an internal combustion engine, the combination of a cylinder having an intake opening, a precompression space, and a receiving space, connected therewith, a piston in said cylinder adapted to cause precompression in said spaces, and means for closing the connection between said spaces near the end of the precompression stroke of said piston.

5. In an internal combustion engine, the combination of a cylinder having an intake opening, a precompression space, and a receiving space, connected therewith, a piston in said cylinder adapted to cause precompression in said spaces, and a valve adapted to admit a gas to said precompression space during one stroke of said piston and to close the connection between said spaces during the opposite stroke of the piston.

6. In an internal combustion engine, the combination of a cylinder having a combustion chamber, an exhaust port and an outer receiving space, two pistons, one within the other, in said cylinder; the outer one having an interior space, said inner piston being operable to establish communication between said interior space and said combustion chamber, and said outer piston being operable to control said exhaust port and to establish communication between said receiving space and said interior space.

7. In an internal combustion engine, the combination of a cylinder, a piston, having inner and outer walls, slidably mounted therein, said inner and outer wall each having an opening therethrough, said cylinder having intake and exhaust ports, an inner piston slidably mounted in the inner wall of said first piston, and means for causing said pistons to reciprocate in such manner as to cause said outer wall opening of said outer piston to register with said cylinder intake at one time, said inner piston to uncover said inner wall opening of said outer piston when charge is to be admitted to the combustion chamber, and the outer wall of said outer piston to uncover said exhaust port when exhaust from said combustion chamber is to take place.

8. In an internal combustion engine, the combination of a cylinder, a piston slidably mounted therein, a second piston mounted with a sliding fit, directly in said first piston, a crankshaft, and means for reciprocating said pistons from said crankshaft with different lengths of stroke, one of said pistons being retarded in its stroke circle in relation to the other, said cylinder having intake and exhaust openings controlled entirely by said outer piston, said outer piston having inner and outer walls with a space therebetween into which charge flows at appropriate times, and said inner wall having an opening therethrough covered by said inner piston at all times except when charge is to be taken therethrough into the interior of the cylinder, said pistons acting jointly to compress the charge in the cylinder, and to be driven by the expanding charge after combustion thereof.

In testimony whereof I have signed my name to this specification at New York, N. Y., this 15th day of March, 1922.

CHARLES J. TÓTH.